(12) United States Patent
Koseoglu et al.

(10) Patent No.: US 10,563,138 B2
(45) Date of Patent: Feb. 18, 2020

(54) METHOD FOR OPTIMIZING CATALYST LOADING FOR HYDROCRACKING PROCESS

(71) Applicants: SAUDI ARABIAN OIL COMPANY, Dhahran (SA); JGC CATALYST AND CHEMICALS LTD., Kanagawa (JP); JAPAN COOPERATION CENTER PETROLEUM, Tokyo (JP)

(72) Inventors: Omer Refa Koseoglu, Dhahran (SA); Adnan Al-Hajji, Dhahran (SA); Hendrik Muller, Dhahran (SA); Masaru Ushio, Kanagawa (JP); Koji Nakano, Kanagawa (JP)

(73) Assignees: SAUDI ARABIAN OIL COMPANY, Dhahran (SA); JGC CATALYSTS AND CHEMICALS LTD., Kanagawa (JP); JAPAN COOPERATION CENTER PETROLEUM, Tokyo (JP)

( * ) Notice: Subject to any disclaimer, the term of this patent is extended or adjusted under 35 U.S.C. 154(b) by 263 days.

(21) Appl. No.: 15/809,578

(22) Filed: Nov. 10, 2017

(65) Prior Publication Data
US 2018/0171243 A1    Jun. 21, 2018

Related U.S. Application Data

(60) Provisional application No. 62/437,304, filed on Dec. 21, 2016.

(51) Int. Cl.
| | |
|---|---|
| C10G 47/12 | (2006.01) |
| C10G 47/14 | (2006.01) |
| C10G 47/16 | (2006.01) |
| C10G 47/18 | (2006.01) |
| C10G 47/20 | (2006.01) |
| C10G 65/02 | (2006.01) |
| C10G 65/00 | (2006.01) |
| B01J 23/883 | (2006.01) |
| B01J 23/882 | (2006.01) |
| B01J 35/10 | (2006.01) |
| B01J 21/12 | (2006.01) |
| B01J 21/04 | (2006.01) |
| C10G 47/00 | (2006.01) |
| C10G 65/12 | (2006.01) |
| C10G 65/04 | (2006.01) |
| B01J 29/10 | (2006.01) |
| C10G 45/72 | (2006.01) |
| C10G 45/02 | (2006.01) |
| C10G 47/36 | (2006.01) |
| C10G 49/26 | (2006.01) |
| B01J 35/00 | (2006.01) |
| C10G 49/00 | (2006.01) |
| B01J 29/89 | (2006.01) |

(52) U.S. Cl.
CPC .............. *C10G 65/00* (2013.01); *B01J 21/04* (2013.01); *B01J 21/12* (2013.01); *B01J 23/882* (2013.01); *B01J 23/883* (2013.01); *B01J 29/106* (2013.01); *B01J 35/0006* (2013.01); *B01J 35/1014* (2013.01); *B01J 35/1019* (2013.01); *B01J 35/1042* (2013.01); *C10G 45/02* (2013.01); *C10G 45/72* (2013.01); *C10G 47/00* (2013.01); *C10G 47/36* (2013.01); *C10G 49/002* (2013.01); *C10G 49/26* (2013.01); *C10G 65/04* (2013.01); *C10G 65/12* (2013.01); *B01J 29/89* (2013.01); *C10G 2300/202* (2013.01); *C10G 2300/205* (2013.01); *C10G 2300/206* (2013.01); *C10G 2300/301* (2013.01); *C10G 2300/70* (2013.01)

(58) Field of Classification Search
CPC ........ C10G 47/12; C10G 47/14; C10G 47/16; C10G 47/18; C10G 47/20; C10G 65/02
See application file for complete search history.

(56) References Cited

U.S. PATENT DOCUMENTS

| | | | |
|---|---|---|---|
| 3,617,490 A | 11/1971 | Csicsery | |
| 3,793,190 A | 2/1974 | Nastast et al. | |
| 4,657,663 A * | 4/1987 | Gardner | B01J 23/85 208/210 |
| 4,822,476 A | 4/1989 | Ziemer et al. | |
| 5,215,955 A * | 6/1993 | Threlkel | B01J 21/04 502/221 |

(Continued)

FOREIGN PATENT DOCUMENTS

| | | |
|---|---|---|
| CN | 101053846 A | 10/2007 |
| JP | 2003171671 A | 6/2003 |

(Continued)

*Primary Examiner* — Randy Boyer
(74) *Attorney, Agent, or Firm* — Abelman, Frayne & Schwab

(57) ABSTRACT

The invention relates to a method for optimizing layered catalytic processes. This is accomplished by testing various catalysts with a compound found in a feedstock to be tested, to determine the facility of the catalyst in hydrogenating, hydrosulfurizing, or hydrodenitrogenating the molecule, and hence the feedstock. In a preferred embodiment, the Double Bond Equivalence of the feedstock and molecule are determined, and catalysts are pre-selected based upon their known ability to work with materials of this DBE value. In preferred embodiments, the layered catalysts include a demetallization catalyst, used before hydrocracking. In additional preferred embodiments, the test feedstock contains 500 ppmw or less asphaltenes, preferably $C_5$-asphaltenes.

21 Claims, No Drawings

(56) References Cited

U.S. PATENT DOCUMENTS

| | | | |
|---|---|---|---|
| 5,439,360 | A | 8/1995 | Habib et al. |
| 5,916,529 | A | 6/1999 | Scheuerman |
| 6,086,749 | A | 7/2000 | Kramer et al. |
| 6,554,994 | B1 * | 4/2003 | Reynolds ............... B01J 8/0453 208/210 |
| 6,858,132 | B2 | 2/2005 | Kumagai et al. |
| 7,686,949 | B2 | 3/2010 | McCarthy et al. |
| 8,163,169 | B2 | 4/2012 | Maesen et al. |
| 9,347,006 | B2 * | 5/2016 | Koseoglu ............... C10G 65/12 |
| 2011/0079540 | A1 | 4/2011 | Krishna et al. |
| 2012/0111768 | A1 | 5/2012 | Elsen et al. |

FOREIGN PATENT DOCUMENTS

| | | |
|---|---|---|
| JP | 2010163622 A | 7/2010 |
| WO | 93/21284 | 10/1993 |

* cited by examiner

METHOD FOR OPTIMIZING CATALYST LOADING FOR HYDROCRACKING PROCESS

FIELD OF THE INVENTION

The invention relates to methods for improving, and/or optimizing catalytic, hydrocracking processes, via layering a plurality of different catalysts in an order determined by the material to be hydrocracked (e.g., feedstock) and the properties of the catalysts that are used.

In a preferred embodiment, in addition to layering catalysts which hydrocrack a feedstock, a catalyst which demetallizes the feedstock, in part or, preferably, completely, is also layered, preferably on top of the hydrocracking catalysts.

In an additional preferred embodiment, the solvent comprises or consists of $C_5$ paraffinic molecules, and the resulting $C_5$-asphaltene obtained from the feedstock used as the test material is controlled to be 500 ppmw or less. If the test material contains an so-called "$C_5$-asphaltene" content higher than 500 ppmw, it is pretreated, using known methods, to reduce it to 500 ppmw or less.

BACKGROUND AND PRIOR ART

Hydrocracking is an established, reliable and flexible method for transforming materials such as low-value heavy oil fractions into higher value products. Configuration, catalyst choices and operating conditions of the hydrocracking processes and apparatus used, offer flexibility in, e.g., the selection of feedstock, the products of the hydrocracking, operating efficiency, and profitability. Several process configurations are available, including but not being limited to, once-through for series flow), two-stage, single stage, mild hydrocracking etc., with catalysts. The choice of catalysts and their layering are also important in adapting the general processes to produce the desired products.

Hydrocracking processes are used widely in, e.g., petroleum refineries. They are used to process a variety of feedstocks, which usually boil in the range of 370° C. to 520° C. in conventional hydrocracking units, and boil at 520° C. and above in residue hydrocracking units. In general, hydrocracking processes split the molecules of the feed into smaller, i.e., lighter molecules, having higher average volatility and economic value.

Additionally, hydrocracking processes typically improve the quality of the hydrocarbon feedstock used by increasing the hydrogen to carbon ratio of the products of hydrocracking, and by removing organosulfur and/or organonitrogen compounds. The significant economic benefit derived from hydrocracking processes has resulted in substantial improvements of the process, and in more active catalysts.

Mild hydrocracking, or single stage once-through hydrocracking, occurs at operating conditions that are more severe than standard hydrotreating processes, and which are less severe than conventional, full conversion or high pressure hydrocracking processes. Mild hydrocracking processes are more cost effective, but typically result in lower product yields and quality. They produce less middle distillate products of relatively lower quality, as compared to the products of conventional full conversion or high pressure hydrocracking processes.

Single or multiple catalytic systems can be used in these processes, depending upon the feedstock being processed and the product specifications. Single stage hydrocracking is the simplest of the various configurations, and is typically designed to maximize middle distillate yield over a single or multiple catalyst system. Multiple catalyst systems can be deployed, e.g., as a stacked-bed configuration or in multiple reactors.

In a series-flow configuration, the entire hydrocracked product stream from the first reaction zone, including light gases (e.g., $C_1$-$C_4$ gases, $H_2S$, $NH_3$) and all remaining hydrocarbons, move to a second reaction zone. In the two-stage configuration the feedstock is refined by passing it over a hydrotreating catalyst bed in the first reaction zone. The effluents are passed to a fractionating zone to separate the light gases, naphtha and diesel products which boil at a temperature range of 36° C. to 370° C. The hydrocarbons boiling above 370° C. pass to the second reaction zone for additional cracking.

Conventionally, most hydrocracking processes that are implemented for production of middle-distillates, e.g., those molecules which boil at a range of from about 180° C. to about 370° C. and gasoline, e.g., those molecules which boil at a range of from about 36° C. to about 180° C. after reforming processes.

In all of the above-described hydrocracking process configurations, cracked products, along with partially cracked and unconverted hydrocarbons, are passed to a distillation column for fractionating into products which may include naphtha, jet fuel/kerosene, and diesel fuel, which boil at the nominal ranges of 36° C.-180° C., 180° C.-240° C. and 240° C.-370° C., respectively, and unconverted products which boil at temperatures above 370° C. Typical jet fuel/kerosene fractions (i.e., smoke point >25 mm) and diesel fractions (i.e., cetane number >52) are of high quality and exceed worldwide transportation fuel specifications. Although hydrocracking unit products have relatively low aromaticity, aromatics that do remain have lower key indicative properties (smoke point and cetane number).

In the above-described embodiments, the feedstocks generally include any liquid hydrocarbon feed conventionally suitable for hydrocracking operations, as is known to those of ordinary skill in the art. For instance, a typical hydrocracking feedstock is vacuum gas oil (VGO), which boils at temperatures of 370° C. to 520° C. Other intermediate refinery streams including demetalized oil (DMO) or deasphalted oil (DAO), and coker gas oils from delayed coking units. Cycle oils from fluid catalytic cracking units which can be blended with VGO or can be used as is. The hydrocarbon feedstocks can be derived from naturally occurring fossil fuels such as crude oil, shale oils, coal liquid, or from intermediate refinery products or their distillation fractions such as naphtha, gas oil, or combinations of any of the aforementioned sources.

The catalysts used in first and second stage hydroprocessing reaction zones typically contain one or more active metal components selected from the IUPAC Group 4-10, of the Periodic Table of the Elements. In certain embodiments, the active metal component is one or more of cobalt, nickel, tungsten, molybdenum, or noble metals, such as platinum or palladium, typically deposited or otherwise incorporated on a support, e.g., alumina, silica alumina, silica, titanium or a zeolite or variations thereof which have been modified by, e.g., steam or acid treatment and/or insertion of metals into the zeolite framework.

The first stage process, referred to supra, hydrotreats the feedstock, essentially resulting in removal of nitrogen, sulfur, and sometimes metals contained in the feedstock molecules. Hydrocracking reactions which also take place in the first stage and result in conversion of from 10-65 wt % of the feedstock. As compared to the first stage, second stage processing occurs at lower temperatures, the specifics of which will depend on the feedstock. Exemplary conditions for both stages in these two stage processes include a reaction temperature of from 300° C. to 450° C., a reaction pressure of from 80 to 200 bars, and a hydrogen feed rate below 2500 SLt/Lt.

The catalysts used in the first and second stage may be the same, or different. Typically, a catalyst used in the first stage has an amorphous base (alumina or silica alumina), containing either Ni/Mo, Ni/W, or Pt/Pd when deep hydrogenation is needed. There are, however, process configurations directed to conversion of up to 75 wt % of the feedstock. In such processes, a zeolite catalyst is preferably used. The second stage catalyst may be any of these as well.

To increase the efficiency and profitability of the process, the hydrocracking units are pushed to process heavier feed streams, whether they are deep cut VGO or some other feedstream coming from intermediate refinery processes, such as a coker, an FCC or residue hydroprocessing units. These heavy feedstocks are processed at the cost of reduced cycle length, higher hydrogen consumption, and/or low product yields and quality. New catalysts and/or optimum layering of catalysts are needed to increase the process performance, in addition to optimizing other process parameters, such as better liquid-gas distribution, reactor volume efficiency, etc.

Catalyst layering or loading is well known in the art. For a given objective, hydrocracking catalysts are loaded, based on their functionality, e.g., acidity, and content of active metals, such as Co—Mo (usually used for hydrodesulfurization), Ni—Mo (usually used for hydrodenitrogenation), and Pt/Pd (usually used for hydrogenation for sulfur/nitrogen free hydrocarbons). These practices require lengthy catalyst testing programs to optimize the catalyst layering in the fixed-bed reactor.

Examples of catalytic layering techniques may be seen in, e.g., Published PCT Application 2011/0079540 to Krishna, et al., which describes methodologies where waxy, hydrocarbon feedstocks are contacted to layered catalysts; however, the double bond equivalency, or "DBE" model used by this invention, is not described, nor is the use of sulfur or nitrogen containing compounds, e.g., dibenzothiophenes or cabazoles, as well as derivates thereof, to determine catalytic activity for the layered catalysts. U.S. Pat. No. 5,186,818 to Daage, et al., also fails to teach a DBE model for testing catalysts. U.S. Pat. No. 7,387,712 to Furta, et al., U.S. Pat. No. 4,657,663 to Gardner, et al., and Published PCT Patent Application 2012/0111768 to Elsen, all describe layered catalyst systems, without describing the DBE method, which is key to the invention. U.S. Pat. No. 9,347,006, incorporated by reference, teaches the important interplay of DBE values and layering catalysts.

Also see, e.g., Published PCT Application 1993/021284, U.S. Pat. Nos. 8,163,169; 7,686,949; 6,576,119; 6,086,749; 5,916,529; 5,439,860; 4,822,476; 3,793,190; and 3,617,490, as well as JP 2010163622; JP 2003171671; JP 11080753; and CN 101053846, all of which are incorporated by reference.

It is a purpose of the invention to improve catalyst layering in hydrocarbon cracking processes, by evaluating the feedstock to be treated, and the properties of the catalysts which are employed. At present, standard methods for developing specific hydrocracking protocols use trial and error to select optimum catalytic systems. To elaborate the prior art methods briefly, catalysts are layered, and process performance is measured for each layered system. As this is a trial and error system, extensive testing is required.

The method of the invention varies from the standard methods, as will be shown in the disclosure which follows.

SUMMARY OF THE INVENTION

The invention relates to an improved method for catalytic hydrocracking, using a fixed bed hydrocracking system with layered catalysts. The method employs ranking and classifying catalysts, using model compounds which are known to be part of the material, to be treated such as a feedstock. One determines molecular composition and reactivity of the feedstock, e.g., and then evaluates catalysts on this basis. Especially useful in this analysis is the double bond equivalence or "DBE" of the material. Via utilizing data from the determination of catalyst activity and the molecular composition of, e.g., the feedstock, an optimum hydrocracking method and system can be set up. The details of the invention as well as specific embodiments thereof will be elaborated upon in the disclosure which follows.

In a preferred embodiment, the layered hydrocracking catalysts are "topped" by a demetallization catalyst which preferably removes all, but can also remove part, of the metals contained in the feedstock.

In an additional preferred embodiment, the test feedstock is prepared to contain 500 ppmw or less of asphaltenes, such as $C_5$-asphaltenes, so as to avoid deactivation of the catalytic materials used.

DETAILED DESCRIPTION OF PREFERRED EMBODIMENTS

The invention relates to an improved method for hydrocracking a hydrocarbon containing feedstock. Containing hydrocarbons, via contacting the feedstock with a layered catalyst system, wherein each catalyst in said system carried out a different function. Details of the methodology will be elaborated upon, infra.

Example 1

This example describes how four different catalysts were evaluated to determine their efficacy in hydrogenation, and hydrocracking processes. Each catalyst was contacted with $H_2S$, for 2 hours, at 400° C. prior to the tests in order to convert the metal oxides in the catalyst to their active, sulfided forms. To test for hydrogenation, reactions were carried out at 330° C., and for hydrocracking, at 380° C. Other relevant parameters were the residence time with the catalyst (1 hour), the initial $H_2$ pressure (70 bars), the amount of catalyst (0.3 g), and reactant volume (1 0 ml).

The results follow, with values being in relation to the best catalyst for each task, which was assigned a value of 100:

TABLE 2

Relative Activities for Catalysts

| Catalysts/ Reactions | Catalyst Type | Catalyst Function | Hydrogenation of Methyl Naphthalene | Hydrocracking of Methyl Naphthalene |
| --- | --- | --- | --- | --- |
| Catalyst 1 | Amorphous | HDS | 100 | 6 |
| Catalyst 2 | Amorphous | HDS/HDN | 68 | 42 |
| Catalyst 3 | Zeolite | Cracking | 62 | 74 |
| Catalyst 4 | Zeolite | Cracking | 82 | 100 |

To elaborate further, catalyst 1 was an amorphous catalyst containing CoMo/Al, known as HDS (hydrodesulfurization) catalyst. Catalyst 2, also an amorphous catalyst, is known as an HDS/HDN (hydrodenitrogenation) catalyst and contains Ni—Mo/Si—Al. Catalyst 3 and 4 are both zeolite containing catalysts, used for hydrocracking. Catalyst 3 designed for conventional VGO feedstock contains Ni—Mo/Si—Al, while catalyst 4 is designed for heavy oils, such as deasphalted oil, contains Ni—Mo/USY zeolite, with Ti—Zr inserted into the zeolite framework.

The experiments used methylnaphthalene, because its structure makes it ideal for both hydrogenation and hydrocracking. As it is known that in hydrocracking apparatus, the molecule is hydrogenated, first and then hydrocracked, knowing the composition of the feedstock permits one to select catalyst and order in layering.

Other compounds which may be used as the model compound include dibenzothiophene, as well as alkylated or naphthalated derivatives thereof, a basic nitrogen compounds, and carbazole molecules which boil at a temperature of from about 180° C. to about 520° C.

The values supra, show that for hydrocracking, catalyst 4 was the optimum choice, while catalyst 1 is preferred for hydrogenation.

This data can be used, as will be shown, infra, to layer catalysts, based upon the content of the feedstock or other material being treated.

Example 2

A feedstock blend was prepared, containing 15 V % demetalized oil ("DMO"), and 85 V % vacuum gas oil ("VGO"). The VGO was analyzed as containing 64% heavy VGO ("HVGO") and 21% light VGO ("LVGO").

The feedstock had a specific gravity of 0.918, an API gravity of 22.6 degrees, contained 2.2 wt % of sulfur, 751 ppmw nitrogen, 2 ppmw total Ni and V, and had a bromine number of 3.0 g/100 g feedstock. Other properties included 12.02 wt % hydrogen, an "IBP" (initial boiling point) of 210° C., a 10/30 of 344/411° C., a 50/70 of 451/498° C., a 90/95 of 595/655° C., and a 98 of 719° C. Maximum double bond equivalency ("DBE"), which is calculated for each molecule by counting the ring structures and the number of double bond present, values were 31 for Sulfur, 31 for Nitrogen, and 32 for hydrocarbons.

Experiments were carried out using a two stage system with reactors in a series hydrocracking process. In the first stage, the feedstock was demetalized, hydrodenitrogenated and hydrodesulfurized, and in the second stage, it was hydrocracked.

In the first stage, the feedstock was contacted to a layered catalyst system in a first reactor. The bottom layer of the layered system was a Ti, Zr-USY zeolite designed for DMO hydrocracking catalyst. It constituted 37.5 wt % of the amount of catalysts used into. An equal amount of an amorphous denitrogenation catalyst designed for VGO feedstock hydrocracking was placed on top of this.

A thin layer of a demellization catalyst was loaded on the top of the reactor. Its volume was an additional 5% relative to the total load, and was sufficient to remove metals from the feedstock.

After reacting with the layered catalysts, the reactor effluents moved to a second reactor, containing 25.0 wt % of a zeolite hydrocracking catalyst designed for VGO feedstock hydrocracking 4.

The table, which follows, details the results of the experiment:

| | | | | |
|---|---|---|---|---|
| Operation time | hours | 134 | 182 | 278 |
| Temperature Reactor 1 | ° C. | 365 | 376 | 379 |
| Temperature Reactor 2 | ° C. | 351 | 360 | 365 |
| WABT | ° C. | 362 | 372 | 376 |
| LHSV | 1/hr | 0.360 | 0.362 | 0.334 |
| Density | Kg/Lt | 0.8475 | 0.8165 | 0.7826 |
| Sulfur | ppmw | 60 | 12 | 7 |
| Nitrogen | ppmw | 2 | 1 | 1 |
| Yields | | | | |
| $C_1$-$C_4$ | W % | 1.3 | 3.4 | 5.2 |
| $C_5$-85° C. | W %/FF | 1.4 | 2.5 | 4.1 |
| 85-149° C. | W %/FF | 10.5 | 21.0 | 36.8 |
| 149-185° C. | W %/FF | 4.7 | 8.7 | 13.4 |
| 185-240° C. | W %/FF | 9.6 | 14.0 | 16.6 |
| 240-315° C. | W %/FF | 13.0 | 14.1 | 11.8 |
| 315-375° C. | W %/FF | 10.5 | 8.9 | 4.6 |
| 375-560° C. | W %/FF | 41.6 | 22.3 | 5.1 |
| 560+° C. | W %/ff | 4.9 | 2.6 | 0.0 |
| Conversion 375° C.+ | wt % | 48.5 | 72.4 | 94.4 |

While metals were not measured in the streams exiting the beds, (demetallization is effective in the demetallization bed and the metal amount is small enough to measure in products), analysis showed metal was completely removed.

It will be seen that nearly all sulfur and nitrogen were removed at the end of the reaction, with nearly complete conversion of the feedstock to lighter weight molecules (i.e., those which boil at temperatures of 375° C. or below.

Example 3

This example shows the results of comparative experiments using different catalyst systems.

As with the preceding example, a two reactor system was used.

In a first set of experiments, the first reactor contained equal amounts (37.5 wt % each, based on total catalyst weight), of a Ti, Zr-USY zeolite catalyst designed for feedstock hydrocracking on top of which was placed a hydrotreating catalyst designed for VGO/Vacuum residue hydrodesulfurization (Co—Mo/Al, amorphous, without zeolite). The second reaction chamber contained 25 wt %, relative to total catalyst weight of Ni—Mo/USY zeolite, hydrocracking catalyst designed for VSO feedstock hydrocracking.

The catalytic system placed in the first reactor was designed for feedstocks which have a DBE >25, i.e., feedstock containing heavier molecules, (a blend of VGO and DMO), the latter of which is a solvent soluble fraction of vacuum residue, which boils at a temperature above 520° C.

The second test used, in the first reactor, a catalytic system designed for lighter molecules, i.e., feedstocks with a DBE <24, which is typical of VGO feedstocks, with boiling point of 370° C. to 520° C.

The first reactor contained, as its bottom layer, 60 wt % of a hydrodenitrogenation catalyst which was an amorphous, Ni—Mo/Si—Al catalyst, in contrast to the zeolite of the first example.

The upper layer of the catalyst system was a Co—Mo/Al amorphous, hydrodesulfurization catalyst. A total of 15.0 wt % of this catalyst was the top layer.

The second reactor was filled with 25 wt % of the same hydrocracking catalyst used in the first set of experiments.

The systems were then evaluated to determine what temperature was required to achieve a desired degree of hydrocracking.

The first catalytic system (Example 2) was found to require a temperature of 370° C., to achieve the same degree of hydrocracking as the second system (Example 3), or 395° C.

The foregoing examples set forth features of the invention, which relate to methods for improving or optimizing layered hydrocracking processes. The process of the invention calls upon one to determine at least one property of the feedstock to be used, such as the double bond equivalence, or "DBE". This determination of these properties is well within the purview of the skilled artisan. This determination permits the artisan to make a first selection of catalysts because, as shown, supra, different catalysts are useful for feedstocks with different properties, such as ranges of DBE values.

Following this step, the process involves selecting a molecule which is present in the feedstock, so as to test it, in its pure form, with various catalysts. Again, the skilled artisan can easily determine the molecular content of a feedstock.

The molecule chosen must be capable of being one or more of hydrogenated, hydrodesulfurized, or hydrodenitrogenated. Indeed, it may be capable of being subject to two, or all 3 of these reactions.

The test molecule is then contacted to a plurality of catalysts useful for hydrocracking feed stock with the predetermined DBE, with the catalyst being evaluated as a result of the products of the hydrocracking process.

As hydrocracking reduces DBE values, the next step in the process calls for assessing a second plurality of catalysts, with the same properties as listed supra, except this second group of catalysts is chosen from catalysts known to be suitable for feedstocks with DBE values below the first group.

Once an optimal catalyst is determined, the first and second catalysts are layered in a reaction chamber, followed by contact of a feedstock thereto, under conditions, such as those discussed infra, which promote formation of lower weight hydrocarbons from the feedstock.

As noted, supra, in a preferred embodiment, at least one demetallization catalyst is used as well and is placed atop the layered catalysts determined supra. This permits removal of any metals in the feedstock as it reaches the tested catalysts.

Demetallization catalysts are well known to the art. Common properties include porous materials including, but not being limited to, silica, alumina, titania, or combinations of these, with or without other materials. When they contain active phase materials, Ni, Mo, or Ni—Mo are preferred, at a concentration of 2-5 w %. Exemplary properties are a maximum metal loading capacity of 100 w % (on a fresh catalyst basis), active phase metals at concentrations of from about 1% to about 20% (by weight), with Ni, Co, and Mo, alone or in combination of 2 or all 3 being preferred. The shape of the demetallization catalyst is not critical, and can be in the form of, e.g., spheres, extrudates, cylinders, trilobes, or quadrilobes, e.g. The diameter of the catalyst particles is preferably from 1-3 mm; surface area is preferably 60-150 m², and total pore volume is preferably about 100 cm³/g, with pore sizes of from 100-600 Angstroms. When a demetallization catalyst is used, it can possess one, several, or all of these properties. For example, referring to the examples, supra, one can use a hydrodemetallization catalyst with a capacity to remove and store at least 50 w % metal (relative to fresh catalyst weight metal in its pores), but preferably 100%. The catalyst has a surface area of at least 120 m²/g and can reach 400 m²/g, a pore volume of 0.5 cc/g, preferably at least 1.5 cc/g, and be on an alumina, silica, or titania support, or a support containing two or more of these. As noted supra, several active metals are preferred, with Ni, Mo, and combinations containing or consisting of one or both of these also preferred. Particle sizes of at least 1/32 inch are preferred, and pore sizes of 100-600 Angstroms.

Other facets of the invention will be clear to the skilled artisan and need not be reiterated here.

The terms and expression which have been employed are used as terms of description and not of limitation, and there is no intention in the use of such terms and expression of excluding any equivalents of the features shown and described or portions thereof, it being recognized that various modifications are possible within the scope of the invention.

The invention claimed is:

1. A method for optimizing a layered catalytic process, comprising (i) contacting a model compound capable of (a) being hydrocracked, (b) being demetalized, (c) hydrodenitrogenation, and at least one of hydrogenation, hydrosulfurization and hydrodenitrogenation to a plurality of catalysts to determine an optimal catalyst for each of (b) and (c) followed by (ii) layering the optimal catalyst for each of (b) and (c) in a reaction chamber based on their activity reacting with said model compound, wherein said catalyst capable of demetallizing said model compound is placed at top of said reaction chamber, and (c) contacting a hydrocarbon containing feedstock for which double bond equivalence (DBE) has been determined to the layered catalysts under condition favoring formation of lower weight hydrocarbon from said hydrocarbon containing feedstock, wherein said model compound boils in the range of 180° C. 520° C. and is selected from the group consisting of methylnaphthalene, dibenzothiophene, and alkylated or naphtalated derivative thereof, a basic nitrogen compound and a carbazole molecule, wherein each of said plurality of catalysts is suitable for hydrocracking a substance with a DBE of said hydrocarbon containing feedstock.

2. The method of claim 1, further comprising contacting said model compound to a second plurality of catalysts suitable for hydrogenating, hydrodesulfurizing, or hydrodenitrogenating a substance with a DBE value less than said feedstock to determine an optimal, second catalyst.

3. The method of claim 1, wherein said hydrocarbons contained in said feedstock have a double bond equivalency of 24 or less.

4. The method of claim 1, wherein said feedstock has a double bond equivalency of 24 or less, and at least one of said plurality of catalysts is a VGO hydrocracking catalyst.

5. The method of claim 1, wherein said feedstock has a double bond equivalency of 25 or more, and at least one of said catalysts is a catalyst designed for heavy feedstock.

6. The method of claim 1, comprising contacting said hydrocarbon containing feedstock to said reaction chamber at a temperature of from 350° C. to 450° C.

7. The method of claim 1, comprising contacting said hydrocarbon containing feedstock to said reaction chamber at a hydrogen feed rate less than 2500 liters per liter of feedstock.

8. The method of claim 1, comprising contacting said hydrocarbon containing feedstock to said reaction vessel at a pressure of from 100 bars to 200 bars.

9. The method of claim 1, wherein at least one of said catalysts contains a metal from the IUPAC Group 4-10 of the periodic table, or is a noble metal.

10. The method of claim 9, wherein said metal is Co, Ni, W, Mo, Pt, or Pd.

11. The method of claim 1, wherein at least one of said catalysts contains amorphous alumina, silica-alumina, titania, Y zeolite, or at least one a transition metal inserted Y zeolite.

12. The method of claim 11, wherein said transition metal is one of Zr, Ti, or Hf and combinations thereof.

13. The method of claim 1, wherein said molecule is capable of being at least two of hydrogenated, hydrodesulfurized, and hydrodenitrogenated.

14. The method of claim 1, wherein said feedstock has an asphaltene content of 500 ppmw or less.

15. The method of claim 1, wherein said catalyst capable of demetallizing said model compound comprises one or more of the following properties: (i) maximum metal loading capacity of 50-100 w % based on fresh catalyst weight; (ii) at least one active phase metal at a concentration of from about 1% to about 20% by weight of said catalyst, (iii) a diameter for particles of said catalyst of from about 1 to about 3 mm; a surface area of about 60 to about 400 $m^2$/g to about 150 $m^2$/g, and a total pore volume of about 0.5 $cm^3$/g to about 100 $cm^3$/g.

16. The method of claim 1, wherein said catalyst capable of demetallizing said model compound capacity for 100 w % of metal relative to weight of said demetallizing catalyst.

17. The method of claim 16, wherein said catalyst capable of demetallizing catalyst is mesoporous.

18. The method of claim 17, wherein said catalyst capable of demetallizing catalyst comprises alumina or silica.

19. The method of claim 18, wherein said catalyst capable of demetallizing catalyst further comprises Ni, Mo, or both.

20. The method of claim 19, wherein said Ni, Mo, or both comprises 2-5 w % of said demetallizing catalyst.

21. The method of claim 1, wherein said catalyst capable of demetallizing catalyst have pores of from 100-600 Angstrom diameter.

* * * * *

UNITED STATES PATENT AND TRADEMARK OFFICE
CERTIFICATE OF CORRECTION

PATENT NO. : 10,563,138 B2  
APPLICATION NO. : 15/809578  
DATED : February 18, 2020  
INVENTOR(S) : Omer Refa Koseoglu et al.

Page 1 of 1

It is certified that error appears in the above-identified patent and that said Letters Patent is hereby corrected as shown below:

In the Claims

In Claim 1, at Column 8, Line 32, after "...boils in the range of" delete "180° C. 520° C." and substitute therefore --- 180° C. - 520° C. ---.

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*